United States Patent [19] [11] 4,211,273
Scheurecker [45] Jul. 8, 1980

[54] ARRANGEMENT AT A CONTINUOUS CASTING PLANT

[75] Inventor: Werner Scheurecker, Linz, Austria

[73] Assignee: Voest-Alpine Aktiengesellschaft, Linz, Austria

[21] Appl. No.: 24,305

[22] Filed: Mar. 27, 1979

[30] Foreign Application Priority Data

Apr. 5, 1978 [AT] Austria ............................... 2381/78

[51] Int. Cl.² .......................................... B22D 11/128
[52] U.S. Cl. .................................... 164/150; 164/448
[58] Field of Search .......................... 164/150, 442, 448

[56] References Cited

U.S. PATENT DOCUMENTS 4,090,549  5/1978  Ives et al. ...................... 164/150 X Primary Examiner—Robert D. Baldwin
Attorney, Agent, or Firm—Brumbaugh, Graves, Donohue & Raymond

[57] ABSTRACT

An arrangement at a continuous casting plant, in particular a continuous casting plant for slabs, includes strand guiding rollers supported by means of supporting brackets or holding means, and a strand guiding stand for bracing the holding means via load measuring devices. Load measuring devices, including a supporting head, are each inserted in a bushing that is mounted on the strand guiding stand and is open towards the roller. The supporting head of the measuring means is directed towards the strand guiding roller and is peripherally surrounded by the bushing so as to leave free a narrow annular gap. Grease under pressure is provided in the space between the bushing and the load measuring device and emerges at the annular gap, thus forming a grease ring.

11 Claims, 3 Drawing Figures

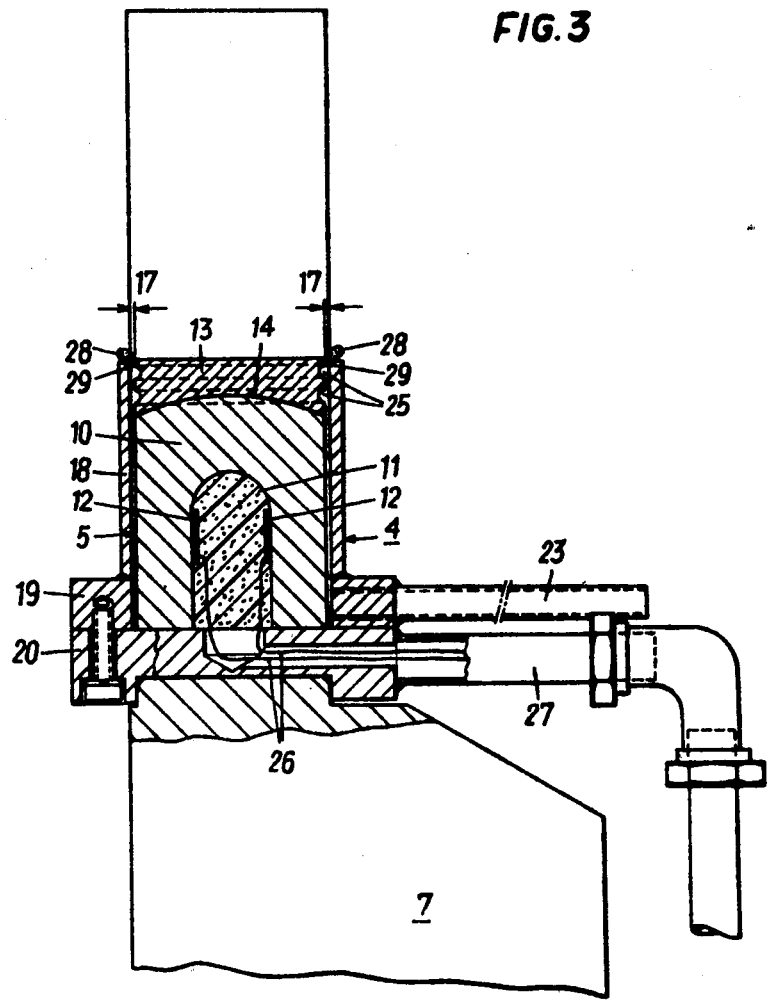

ARRANGEMENT AT A CONTINUOUS CASTING PLANT

BACKGROUND OF THE INVENTION

The invention relates to an arrangement at a continuous casting plant, in particular a continuous casting plant for slabs, wherein strand guiding rollers retained in of supporting brackets or holding means are supported on a strand guiding stand via load measuring means.

For the experimental determination of the loads exerted on a strand guiding stand by a cast strand, in particular on the strand guiding rollers, the supporting brackets or holding means of the rollers have hitherto been fastened to the strand guiding stand through interposed load measuring means, for instance load cells. Such load measuring means, due to their sensitivity to high temperatures and contamination by rust, cinders and splashing water, could be provided only on rollers supported beyond the region immediately surrounding the strand. In particular, so far it has not been possible with rollers multiply supported along their longitudinal extensions, to measure, by means of load measuring means, the forces occurring at the places of support arranged between the ends of such a roller, with the exactness required for an evaluation of the results measured.

Such an evaluation of the results measured can, for instance, give rise to a revised layout and dimensioning of a strand guiding stand and of strand guiding rollers, depending on the measurement of the forces caused by the ferrostatic pressure and those caused by deformation, such as the bending of the strand. An evaluation of the results measured can also be used to actuate warning and safety devices before the occurrance of extensive forces jeopardizing the strand guiding rollers, whereby damage to the strand guiding rollers can be avoided. A determination, as exact as possible, of the forces caused by the strand is therefore of great importance.

SUMMARY OF THE INVENTION

The invention has as its object to provide an arrangement at a continuous casting plant of the initially-described kind with which it is possible to precisely determine the forces acting on the strand guiding rollers, even in that region where the highest temperatures in the strand guide occur, i.e. immediately below the mould and, in particular, in the region of the middle of the broad side of slabs. Falsely measured values as have previously occurred with load measuring means provided at continuous casting plants, are to be reliably avoided. In particular the load measuring means are to be kept free from cinders and splashing water.

According to the invention, this object is achieved in that load measuring means, each with a supporting head, are each inserted in respective bushings mounted on the strand guiding stand and are open towards a pertaining strand guiding roller. The supporting head, which is directed toward the strand guiding roller, is peripherally surrounded by the bushing so as to leave free a narrow annular gap. Grease is provided in the space between the bushing and the load measuring means and is pressed therein so that it emerges from the annular gap to form a grease ring.

In this case it is advantageous if the bushing is connected to a grease pressure pump by means of a grease supply conduit, renewal of the grease supply during operation of the plant thus being possible.

Suitably, the load measuring means is combined with the bushing to form a construction unit.

In order to be able to take into account the different directions of application of the force on the load measuring means, the supporting head is suitably pivotally fastened to the body of the load measuring means.

The sealing effect of the grease provided between the supporting head and the bushing advantageously can be improved by a groove arranged at the part of the supporting head within the bushing.

According to a preferred embodiment, the load measuring means comprises a hollow measuring body having strain gauges fastened in cavity. The cavity is filled up with synthetic resin and the electrical conductors of the strain gauges are led from the bushing through a side opening in the bottom of the bushing and a protection pipe laterally fastened at this bottom.

With the arrangement of the invention, load measuring means can be provided at all places of support of a roller supported at more than two places. For a simple installation of the arrangement of the invention at a later time, the bushings plus load measuring means are advantageously installed in recesses of the supporting construction of the strand guide.

BRIEF DESCRIPTION OF THE DRAWINGS

The invention will now be described in more detail by way of one embodiment illustrated in the accompanying drawings, wherein:

FIG. 3 is a section along line III—III of FIG. 2.

DESCRIPTION OF A PREFERRED EMBODIMENT

Figure 1:
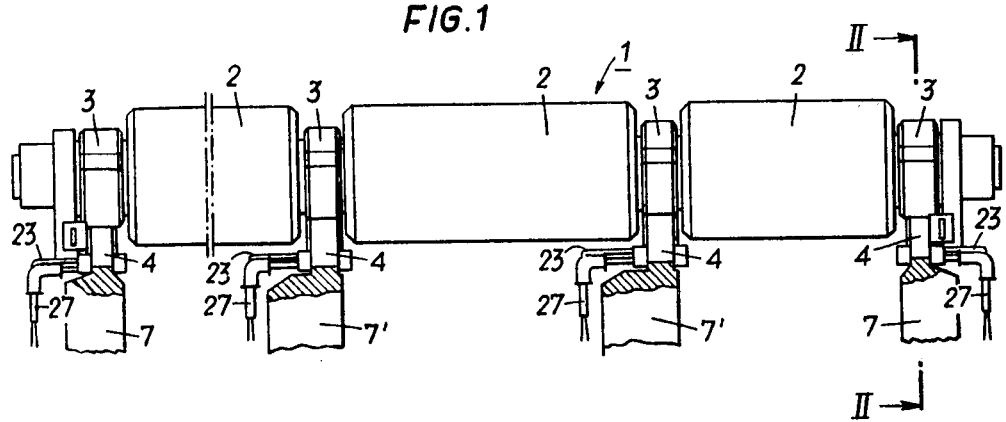
FIG. 1 is a side view of a strand guiding roller.
Figure 2:
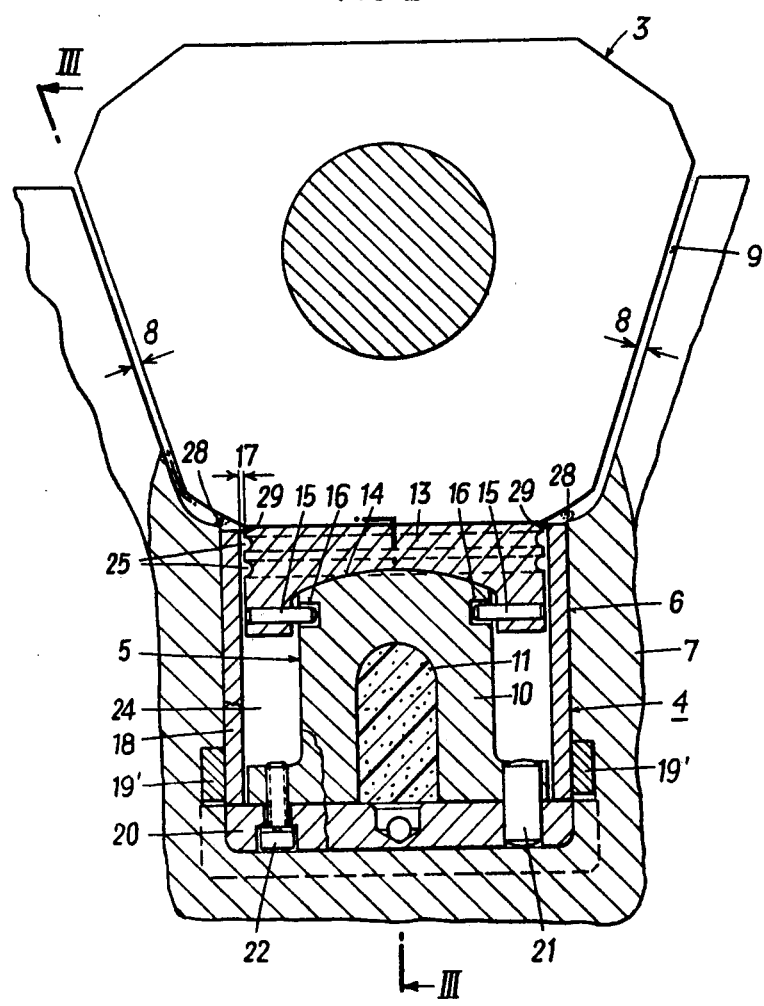
FIG. 2 is a section along line II—II of FIG. 1.

A strand guiding roller 1 is assembled of several roller bodies 2 rotatably mounted on an axle supported in holding means 3. Each holding means 3, which is in the form of a supporting bracket, rests on a load measuring means 5 inserted in a bushing 4. Each bushing 4 is inserted in a recess 6 of carriers 7, 7' of a strand guiding stand not illustrated in detail. The carriers 7, 7' embrace the holding means 3 up to a certain height with a lateral play 8, thus forming pocket-shaped recesses 9 in which the holding means 3 come to lie so as to be laterally and vertically movable.

The load measuring means 5 possesses a hollow cylinderlike measuring body 10, whose inner wall delimits a cavity 11 ons which two strain gauges 12 are fastened (FIG. 3). The cavity 11 is filled with a two-component synthetic resin of polyester base in order to protect the strain gauges. On the upper side of the measuring body 10, a supporting head 13 pivotally rests on a cambered face 14 of the measuring body 10 and is fastened on the measuring body 10 by means of pins 15 projecting into recesses 16 of the measuring body 10. The bushing 4 comprises a prism-like part 18 surrounding the supporting head with a slight peripheral play 17 and a flange 19 at the end facing away from the roller 1, which flange is connected with a bottom plate 20 by a screw connection. Wedges 19' serve for fixing the bushing 4 in the recess 6. The measuring body 10 is positioned on the bottom 20 of the bushing in a precisely central position by means of centering pins 21 and is fastened to the bottom 20 by means of screws 22, whereby the load measuring means 5, together with the bushing 4, forms a construction unit that can be simply and commonly installed into, and removed from, the carriers 7, 7' of the strand guiding stand. A grease supply conduit 23 is laterally connected to the flange 19 and opens into the inner space 24 of the bushing 4. The grease supply conduit 23 is connected to a grease pressure pump not illustrated.

The electrical conductors 26 for the strain gauges 12 are led out of the area of the strand through protection pipes 27 fastened laterally to the bottom of the bushing.

The supporting head 13 is provided with two peripheral grooves 25 located within the prism-like part 18 of the bushing 4. The inner space 24 is completely filled with grease, for instance a high-temperature bearing grease or another lubricating grease of high toughness, which is pressed in via the grease supply conduit. The grease also fills up the grooves 25 and forms a grease ring 28, which emerges from the annular gap 29 formed by the peripheral play 17 and enters into the recess 9. By means of this grease ring 28, the penetration of dirt, cinders and water, into the inner space 24 of the measuring body 10, is reliably prevented.

Through the grease supply conduit, new grease is is led to the inner space 24 of the bushing at predetermined time intervals during the operation of the continuous casting plant. The grease ring at the annular gap 29 is thus being renewed all the time, and tightness is guaranteed, even with extremely high temperature strains and with the movements of the supporting head 13 relative to the bushing 4.

The arrangement according to the invention, in the first place, serves for determining the actual strain that occurs on the rollers of the strand guiding part where the strand has not yet solidified entirely, i.e. where it still has a thin strand skin. Advantageously, the arrangement of the invention, with bow-type continuous casting plants, is applied in the bending zone or in the straightening zone, since it is there that bending and straightening forces will act on the rollers, in addition to the forces caused by the ferrostatic pressure of the cast strand.

The arrangement, according to the invention can also be coupled with a safety arrangement through which the strand is automatically cooled down and the rollers are lifted from the strand surface when excessive loads are exerted on the rollers.

The arrangement according to the invention can be used not only for rollers having roller bodies that are rotatably mounted on stationary axes, but it can be employed also for rollers designed in one piece and rotatably mounted in bearing housings arranged between the roller bodies.

What I claim is:

1. In an arrangement at a continuous casting plant strand guiding rollers, supporting means supporting said strand guiding rollers relative to said strand guiding stand, and load measuring means interposed between at least some of said supporting means between at least some of said strand guiding stand, the improvement which is characterized in that:

bushings are mounted on said strand guiding stand adjacent each supporting means with an interposed measuring means, each of said bushings being open towards the roller pertaining to its supporting means;

each of said load measuring means includes a measuring body and a supporting head, each load measuring means being inserted in one of said bushings with its supporting head directed toward the pertaining roller and being peripherally surrounded by said bushing so as to leave free a narrow annular gap, a space communicating with said annular gap is provided between each one of said bushings and its pertaining load measuring means; and grease is pressed in said space between said bushings and said load measuring means, said grease extending into said narrow annular gap and emerging from said annular narrow gap to form a grease ring.

2. An arrangement as set forth in claim 1, wherein said supporting means are holding means.

3. An arrangement as set forth in claim 2, wherein said holding means are supporting brackets.

4. An arrangement as set forth in claim 1, further comprising a grease supply conduit means for supplying grease under pressure, pump, each one of said bushings being connected to said grease supply conduit means.

5. An arrangement as set forth in claim 1, wherein each load measuring means is combined with its pertaining bushing so as to form a construction unit.

6. An arrangement as set forth in claim 1, wherein said supporting head of each load measuring means is mounted so as to be pivotally movable with respect to its measuring body.

7. An arrangement as set forth in claim 1, wherein said supporting head of each load measuring means is provided with at least one peripheral groove, said at least one peripheral groove being located at a position on said head within the pertaining bushing.

8. An arrangement as set forth in claim 1, wherein each of said load measuring means further includes a cavity within its measuring body, strain gauges fastened in said cavity, and a synthetic resin filling said cavity.

9. An arrangement as set forth in claim 8, wherein said strain gauges include electrical conductors, each of said bushings includes a bottom with a lateral opening therein and a protection pipe laterally fastened to said bottom, said electrical conductors being led towards the outside of the strand guide through said lateral opening and said protection pipe.

10. An arrangement as set forth in claim 1, wherein at least one of said strand guiding rollers is supported at more than two places along its longitudinal extension, said load measuring means being provided at each of said more than two places of its longitudinal extension.

11. An arrangement as set forth in claim 1, wherein said strand guiding stand possesses recesses, said bushings, together with said load measuring means, being installed in said recesses.

* * * * *

UNITED STATES PATENT AND TRADEMARK OFFICE
CERTIFICATE OF CORRECTION

PATENT NO. : 4,211,273
DATED : July 8, 1980
INVENTOR(S) : Werner Scheurecker

It is certified that error appears in the above-identified patent and that said Letters Patent are hereby corrected as shown below:

Col. 1, line 10, delete "of".

Col. 2, line 52, "ons" should read --on--.

Col. 3, between lines 57 and 58, insert --of the type including a strand guiding stand,--.

Col. 3, last line, and Col. 4, first line, change "between at least some of" to --and--.

Col. 4, line 27, delete "pump,".

Signed and Sealed this

Twenty-third Day of September 1980

[SEAL]

Attest:

SIDNEY A. DIAMOND

Attesting Officer

Commissioner of Patents and Trademarks